(12) United States Patent
Scarlata et al.

(10) Patent No.: US 11,637,868 B2
(45) Date of Patent: Apr. 25, 2023

(54) ATTESTATION SUPPORT FOR ELASTIC CLOUD COMPUTING ENVIRONMENTS

(71) Applicant: Intel Corporation, Santa Clara, CA (US)

(72) Inventors: Vincent Scarlata, Beaverton, OR (US); Alpa Trivedi, Portland, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 112 days.

(21) Appl. No.: 17/133,803

(22) Filed: Dec. 24, 2020

(65) Prior Publication Data

US 2021/0336994 A1    Oct. 28, 2021

(51) Int. Cl.
*H04L 9/40*    (2022.01)
*G06F 9/50*    (2006.01)

(52) U.S. Cl.
CPC .............. *H04L 63/20* (2013.01); *G06F 9/505* (2013.01)

(58) Field of Classification Search
CPC ..... H04L 63/20; H04L 63/1433; G06F 9/505; G06F 2209/5011; G06F 9/5072; G06F 21/44
USPC ........................................................... 726/1
See application file for complete search history.

(56) References Cited

U.S. PATENT DOCUMENTS

| 2011/0153684 | A1* | 6/2011 | Yung ................. G06F 9/45533 707/805 |
| 2015/0103692 | A1* | 4/2015 | Jain ..................... H04L 41/0806 370/254 |
| 2019/0042339 | A1* | 2/2019 | Doshi ................ G06F 9/45558 |
| 2019/0220601 | A1* | 7/2019 | Sood ..................... G06F 9/505 |

FOREIGN PATENT DOCUMENTS

| CN | 114675962 A | 6/2022 |
| EP | 4020270 A1 | 6/2022 |
| WO | 2020231952 A1 | 11/2020 |

OTHER PUBLICATIONS

Extended European Search Report for European Patent Application No. 21196250.1 dated Mar. 16, 2022, 7 pages.

(Continued)

*Primary Examiner* — Kambiz Zand
*Assistant Examiner* — Aubrey H Wyszynski
(74) *Attorney, Agent, or Firm* — Jaffery Waston Mendonsa & Hamilton LLP

(57) ABSTRACT

Attestation support in cloud computing environments is described. An example of an apparatus includes one or more processors to process data, including data related to hosting of workloads for one or more tenants; an orchestration element to receive a request for support of a workload of a tenant according to a selected membership policy, the orchestration element to select a set of one or more compute nodes to provide computation for the workload; and a security manager to receive the membership policy and to receive attestations from the selected compute nodes and, (Continued)

upon determining that the attestations meet the requirements of the membership policy, to add the one or more compute nodes to a group of compute nodes to provide computation for the workload.

20 Claims, 10 Drawing Sheets

(56) References Cited

OTHER PUBLICATIONS

Paper White et al: "Edge Computing: from standard to actual infrastructure deployment and software development Authors", Oct. 1, 2019 (Oct. 1, 2019), XP055883211, Retrieved from the Internet: URL:https://www.martechcube.com/resources/intel_q1_nt/ where_ is_the_edge/edge-computing-from-standard-to-actual-infrastructure-deployment-and-software-development.pdf [retrieved on Jan. 25, 2022].

\* cited by examiner

ATTESTATION SUPPORT FOR ELASTIC CLOUD COMPUTING ENVIRONMENTS

TECHNICAL FIELD

Embodiments described herein generally relate to the field of electronic devices and, more particularly, attestation support in cloud computing environments.

BACKGROUND

Massive computation workloads, as in artificial intelligence (AI) and machine learning (ML) applications, require the use of multiple compute nodes. In modern computing architectures, the compute nodes may include multiple different types of processing devices, including central processing units (CPUs) and graphical processing units (GPUs), and varying types of hardware accelerators. GPUs may also be viewed as hardware accelerators in some operations.

It is not generally practical to have a sufficient number of compute nodes on a single platform to process very large computation workloads. As result, such workload may execute on multiple compute nodes on different platforms that are connected via network.

However, the computation needs of a workload may increase or decrease during workload's execution lifecycle. The allocation of the necessary compute nodes that may be needed to meet peak demand may result in an overallocation of resources from multiple platforms, thus either resulting in a waste of compute recourses, or in complications in attestation of compute nodes as processing needs change over time.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
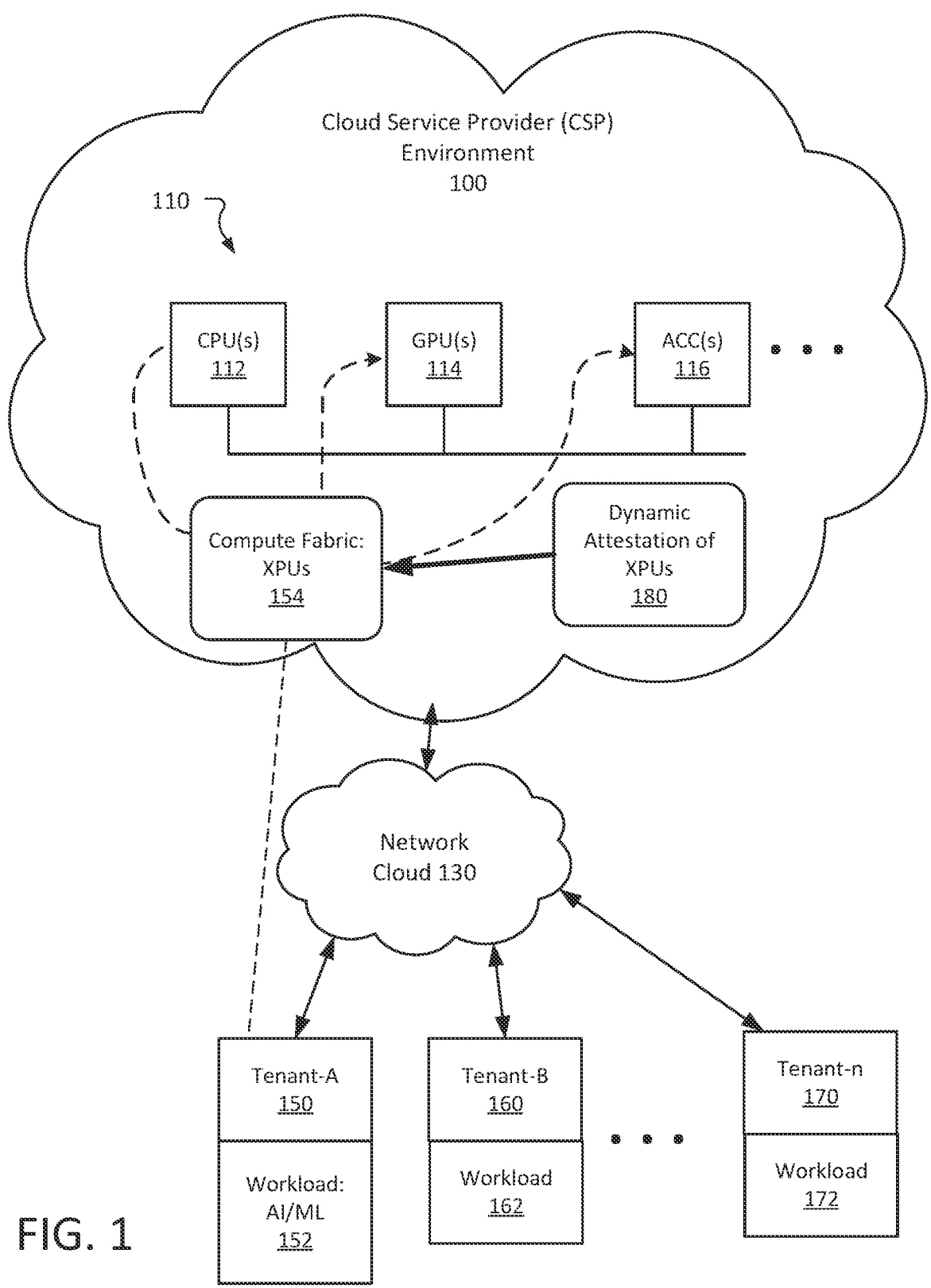
FIG. 1 is an illustration of an elastic cloud service environment to provide dynamic attestation support, according to some embodiments.

Embodiments described herein are directed to attestation support in elastic cloud computing environments.

In cloud service provider (CSP) operations, there are a very large number of compute nodes that are generally spread among many different service platforms across a network. The compute nodes may include processing devices, including central processing units (CPUs) and graphical processing units (GPUs), and varying types of hardware accelerators, such as FPGAs (Field Programmable Gate Arrays) and special purpose ASICs (Application-Specific Integrated Circuits). Such compute nodes may also generally be referred to as XPUs. Such a compute operation is capable of supporting massive workload computation, as in artificial intelligence and machine learning applications. A group of XPUs of a CSP that are involved in execution of a workload for a particular tenant may be described as a compute fabric.

Customers who are running security sensitive workloads require assurance that their workload is running on a trusted compute fabric by being able to attest to the trustworthiness of the compute fabric. In conventional operation, this may be addressed by static attestation, in which attestation occurs once at the start of the execution of the workload.

Existing solutions support static attestation where the workload owner, referred to as a tenant hereon, verifies the attestation of an XPU (i.e., a compute node) or a group of XPUs before sending their workload to run on it. In this solution XPU(s) present evidence that prove the authenticity of the device and integrity of sensitive configurable components such as firmware version number. The tenant or a trusted broker would verify the attestation evidence before allowing the workload to run.

However, the computation needs for an AI/ML workload may increase or decrease during the workload's execution lifecycle. The current solutions cannot properly handle a dynamic compute fabric in which an XPU may join the compute fabric at any time during the workload lifespan. In addition, as the compute fabric becomes larger and spans the relevant datacenter, the fabric may be composed of heterogenous devices such as CPUs, GPUs, FPGAs and ASICs, and the static attestation of such fabric is not sufficiently scalable under such circumstances. The scalability issues become more pronounced when in circumstances in which the heterogenous devices are received from multiple vendors who present differing attestation evidence. As a result, the existing solutions become impractical for a very large workload that can grow and shrink dynamically during operation.

In some embodiments, an apparatus, system, or process is to provide a dynamic attestation operation that can be performed quickly and seamlessly without stopping or disrupting the workload execution. Because the compute fabric can consist of heterogenous compute nodes, the dynamic attestation is required to accommodate device differences in an efficient manner, without being delayed by device specific or vendor specific attestation evidence requirements that are typically applied in static attestation schemes. The dynamic attestation simplifies attestation of large compute fabrics that may consist of diverse compute nodes (CPUs, GPUs, FPGAs, and ASICs) from multiple vendors, making such operation practical and deployable in datacenters of cloud service providers.

FIG. 1 is an illustration of an elastic cloud service environment to provide dynamic attestation support, according to some embodiments. As illustrated, a cloud service provider environment 100 includes support for workloads in multiple different platforms, as multiple processing devices 110 that are connected in some manner. While FIG. 1 specifically illustrates a cloud service provider, embodiments are not limited to this particular example, and may include any environment in which support is provided for workloads by a third party. The environment may be referred to as elastic in that computation support may expand or contract as required for a workload. The platforms of the CSP environment include multiple compute nodes (XPUs), which may be of a variety of different types of processing units, such as CPUs 112 and GPUs 114, and varying types of hardware accelerators 116. The XPUs may be sourced from multiple different hardware vendors, depending on the particular implementation.

Multiple different tenants may connect to the CSP environment to receive processing support for processing of various workloads, some of which may be very complex and require a great deal of computation supports. Further, certain of the workloads may require specific security support, and thus may require attestation of the XPUs that are designated for support of such workloads.

As this is illustrated in FIG. 1, the tenants may include Tenant-A 150 with workload 152, Tenant-B 160 with workload 162, and continuing through Tenant-n 170 with workload 172, which connect to the CSP environment 100 via a particular network cloud 130. In a particular example, workload 152 may be artificial intelligence (AI) or machine learning (ML) workload requiring significant processing support. In some embodiments, the cloud provider may designate a particular set of XPUs, shown as a compute fabric 154, wherein the compute fabric is a group of one or more compute units to support a workload. The compute fabric 154 may include a homogeneous or heterogenous set of XPUs. However, the needs of the workload 152 may expand or contract during the lifespan of the workload, and thus the XPUs within the compute fabric may be modified over time, including the addition of XPUs that were not originally assigned to the compute fabric.

In some embodiments, in contrast with conventional static attestation of the XPUs within the compute fabric, the CSP environment 100 is to provide dynamic attestation of XPUs 180 to enable current attestation. In some embodiments, the dynamic attestation 180 is a membership policy based attestation instead that allows new XPU members to be added to be added to the compute fabric 154 at any time if such XPUs meet the membership policy requirements. In some embodiments, a membership policy provides specific requirements on compute nodes to support attestation policies. The use of membership policy also alleviates the scalability issues in heterogenous compute environment involving hardware from multiple vendors. The cloud service provider is not required to create a static pool that may be overprovisioned to accommodate peak resource needs, thus allowing the cloud service provider to utilize its resources for confidential computing in an efficient way that maximizes resource utilization and lowers total cost of ownership.

Figure 2:
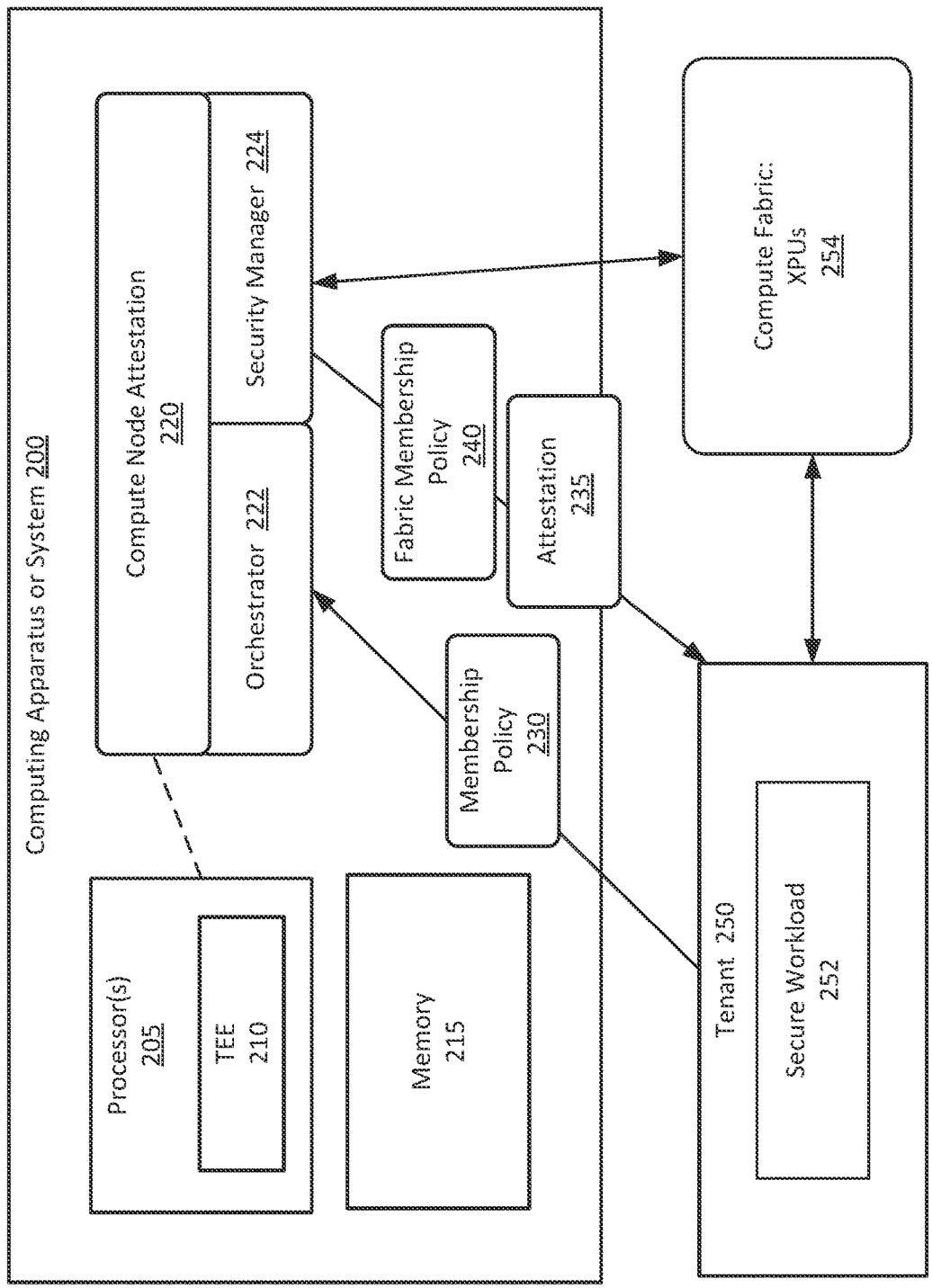
FIG. 2 is an illustration of a computing system or apparatus for a cloud computing environment that provides dynamic attestation support, according to some embodiments.
Figure 7:
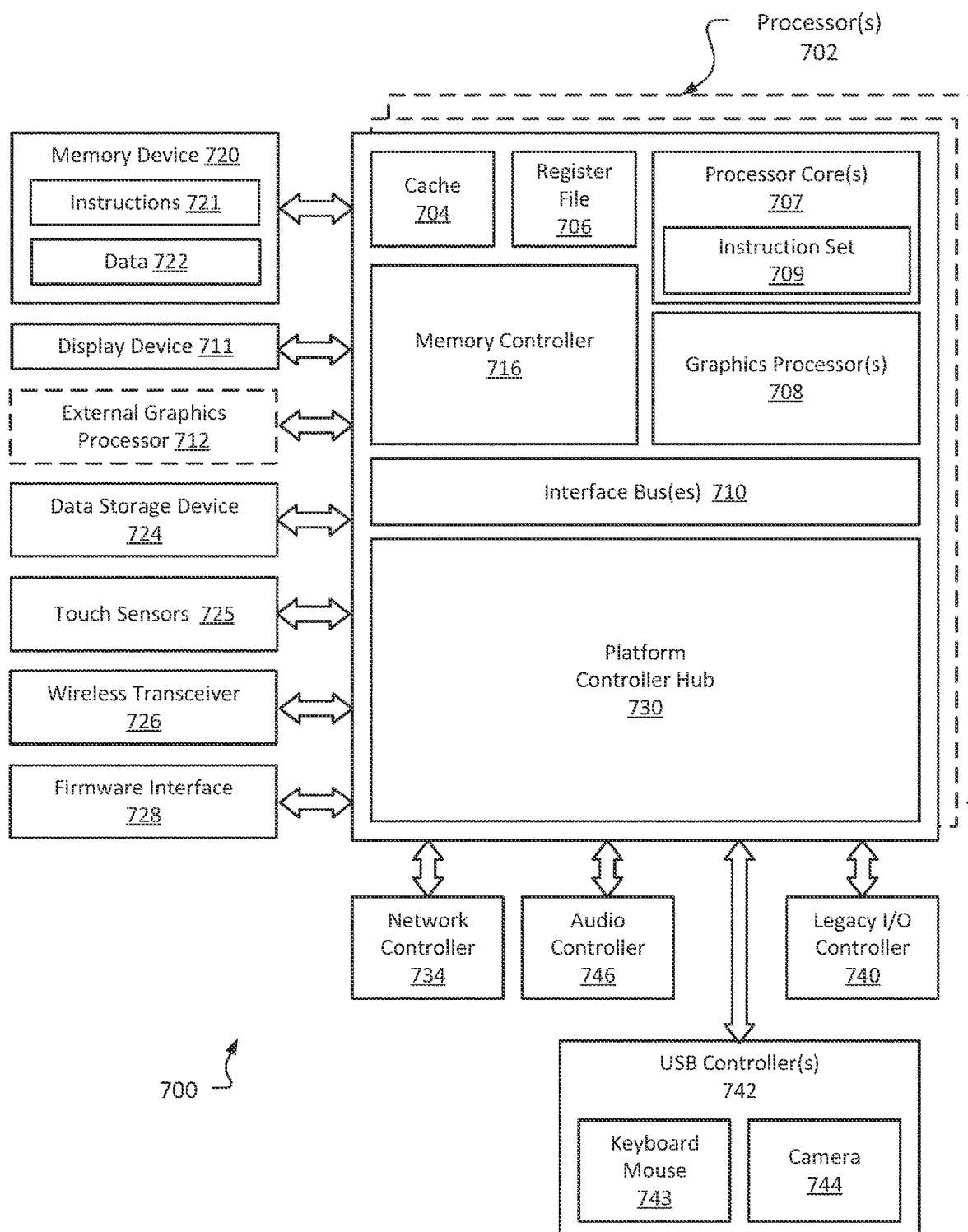
FIG. 7 illustrates an embodiment of an exemplary computing architecture for implementing dynamic attestation support in a cloud environment, according to some embodiments.

FIG. 2 is an illustration of a computing system or apparatus for a cloud computing environment that provides dynamic attestation support, according to some embodiments. As illustrated, a computing apparatus or system 200 includes one or more processors 205, which may each include multiple processing cores, and which may include CPUs, GPUs, and other processing devices. The one or more processors 205 may include one or more Trusted Execution Environments (TEE) 210 for support of secure operations. The apparatus or system 200 may further include computer memory 215 to store data, including data related to the support and operation of a cloud service provider, such as a cloud service provider operating a CSP environment 100 as illustrated in FIG. 1. Other elements of the apparatus or system 200 may be as illustrated in FIG. 7.

In some embodiments, the apparatus or system 200 includes compute node attestation 220, which may be provided by a combination of hardware, software, and firmware, depending on a particular implementation. The compute node attestation 220 operates to support dynamic attestation of compute node to support a compute fabric 254 (a group of one or more compute nodes to support a workload), comprising a plurality of heterogeneous or homogeneous XPUs, to provide processing for a secure workload 252 of a tenant 250. In some embodiments, the computing device attestation 220 includes an orchestrator 222 (referring to an orchestration element) and one or more security managers 224 to provide support for the dynamic attestation of XPUs for tenants. In certain implementations the orchestrator 222 and the security manager may each be a part of a same entity.

In some embodiments, security manager 224 is a trusted entity that tasked with controlling admittance of compute nodes, including processing devices and hardware accelerators, to the compute fabric 254, and with ensuring that the compute nodes adhere to a membership policy 230 that is associated with the tenant. The membership policy 230 may be stored in the memory 215, but the membership policy is not limited to any specific location of storage. In some embodiments, the security manager 224 is to evaluate the eligibility of a compute nodes before such device is authorized to join the compute fabric 254 by verifying that the device meets the requirements of the membership policy 230.

In some embodiments, the security manager 224 is one of a set of multiple security managers. The operation of each security manager in connection with device groups may vary depending on the implementation, including circumstances in which it may be necessary to load balance operations within one or more device groups. In varying embodiments, each security manager of a set of multiple security managers may be dedicated to a respective device group within a set of device groups; or each security manager of the set of security multiple device groups may be dedicated to administering a same device group, or a security manager may administer multiple device groups having the same or different membership policies. The security manager 224 may be an independent entity (for example, a SmartNIC or IPU Orchestration Engine), or may be collocated in the workload devices (for example, CPUs or hardware accelerators that also implement control plane logic).

In some embodiments, the orchestrator 222 is a unit or entity that may be untrusted. The orchestrator 222 is responsible for managing the resources and allocating or deallocating resources to the tenant based on the compute needs of the workload 252. The orchestrator 222 further manages membership policies, including the membership policy 230 selected by tenant 250, and makes the tenant selected policy available to the orchestrator 222 to enable creating a trusted compute fabric 254. The orchestrator 222 may either instruct the security manager 224 regarding which devices to include in the compute fabric 254, or the orchestrator 222 may instruct the devices to contact the security manager 224.

(Stated in another way, the orchestrator 222 controls the selection of compute nodes, while the security manager 224 ensures that the selected devices meet the applicable membership policy.) In either case, the orchestrator 222, which may be untrusted, is limited to facilitating the formation of the compute fabric, with the acceptance of the recommended devices to be determined by the security manager 224 after the security manager receives device attestation and checks this against the membership policy.

In general the tenant 250 is a cloud customer that may wish to run its large security sensitive workload 252 in a cloud environment. The tenant 250 does not know which specific resources will be assigned to it ahead of time, in general does not have the ability to statically evaluate attestation of each of such resources.

In some embodiments, the tenant 250 is to craft or select the membership policy 230 to define acceptability restrictions for possible members of the compute fabric, and is to provide the membership policy 230 to the orchestrator 222 (where providing the membership policy may include transmitting the policy or providing an identification of the policy if the membership policy may be otherwise accessed by the orchestrator 320). The orchestrator selects the computation resources for the compute fabric 254 and informs the security manager 224. The orchestrator 222 further passes the selected membership policy 230 to the security manager 224 to utilize in determining acceptability of compute nodes for the compute fabric 254, and providing an attestation 235 to the tenant 250. In some embodiments, the tenant 250 or another party may then evaluate the attestation 235 of security manager 224. The tenant also receives the membership policy 240 of the compute fabric 254 from the security manager 224 and may verifies the against the membership policy 230 that the tenant 250 had selected and provided to the orchestrator 222.

In some embodiments, if the compute needs for the workload 252 increase, the orchestrator 222 may assign additional resources to the compute fabric 254. This may be done by instructing the security manager 224 to add a specific resource or by instructing the device to contact the security manager 224 directly for purposes of being added to the compute fabric 254. Regardless of where the request originates, the security manager 224 will evaluate the device attestation against the membership policy 240 before accepting it into the compute fabric 254. If the device meets the membership policy requirements, the device is added to the compute fabric 254 and the group's keying material is shared with it. This operation may be provided transparently without involving the tenant because the security manager 224 is a trusted entity. This operation is further illustrated in FIG. 4.

Figure 3:
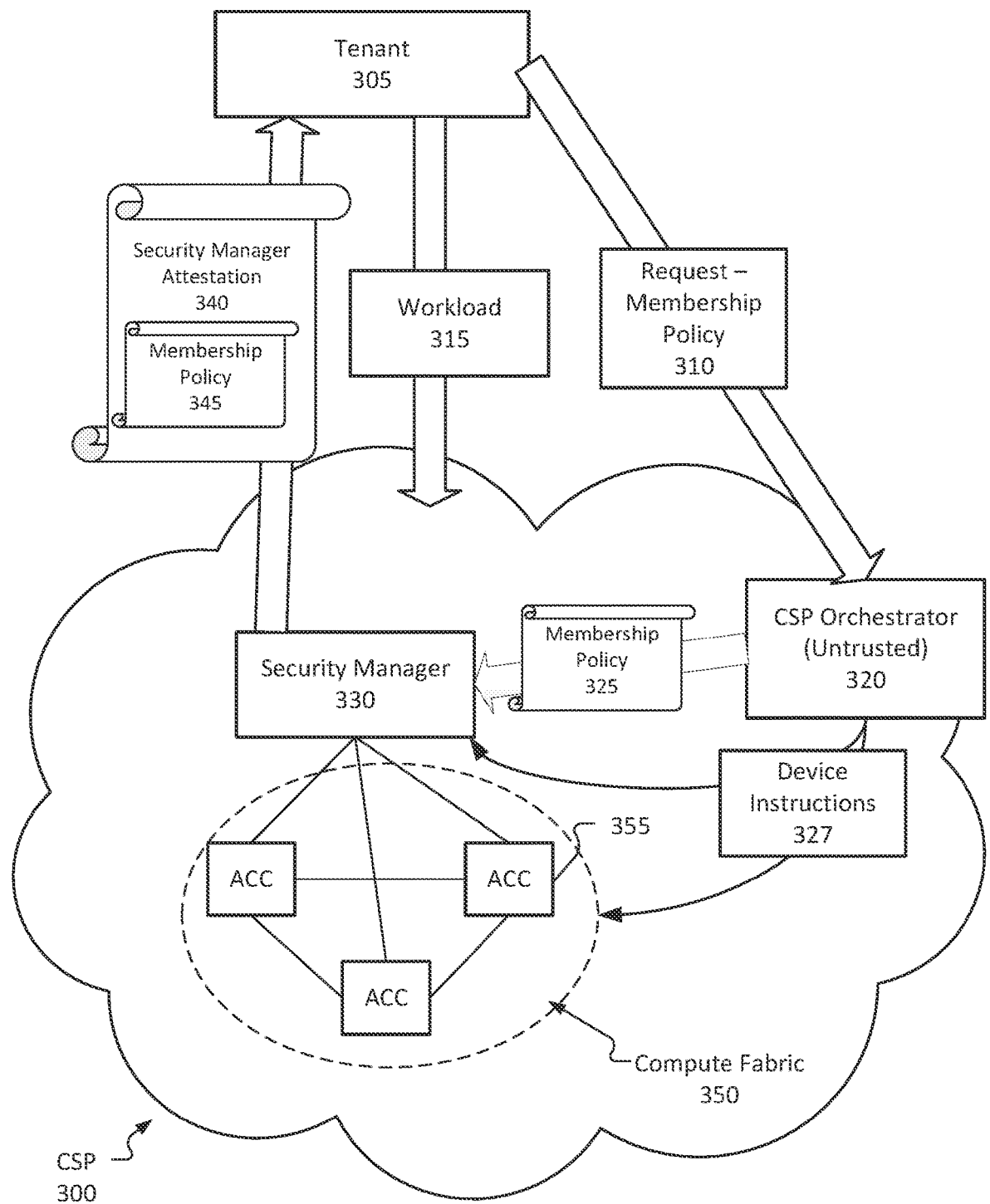
FIG. 3 is an illustration of an operation to provide dynamic attestation of a compute fabric, according to some embodiments.

FIG. 3 is an illustration of an operation to provide dynamic attestation of a compute fabric, according to some embodiments. In some embodiments, a tenant 305 may require attestation of a set of compute nodes (multiple XPUs) to be provided by a CSP 300 (or other third party providing workload support) for a secure workload, wherein the members of the set of compute nodes may change over time to add or eliminate certain units as the computation needs of the workload change over time.

In some embodiments, the tenant 305 is to provide a request 310 to a cloud service provider (CSP) 300 via a CSP orchestrator 320, wherein the CSP orchestrator may be an untrusted element. As such, the request 310 may be provided without any secure information. In some embodiments, request may include information regarding the security requirements that are needed for the CSP support of the workload 315, and in particular may provide (such as by transmitting or identifying) a membership policy to the CSP orchestrator 320.

In some embodiments, the orchestrator 320 is to select compute nodes to support the workload 315 of the tenant 305. In this particular example the compute nodes may include a set of hardware accelerators (ACC) 355. The orchestrator 320 is transmit device instructions 327 regarding the identified compute nodes, wherein the instructions 327 may include either instructions to a security manager 330 (which may be one of multiple security managers) regarding the identified devices or instructions to the identified devices to contact the security manager 330. It is noted that there may be addition communications between the orchestrator 320 and the security manager 330 with regard to the selection and attestation of devices, such as in circumstances in which one or more devices cannot be attested and thus may need to be replaced with one or more other devices.

In some embodiments, the CSP orchestrator 320 is further to transfer the membership policy 325 for the tenant 305 to the security manager 330, the membership policy being an agreement between the tenant and the CSP regarding the environment that the CSP will provide to support the tenant workload. The membership policy may be defined or selected by the CSP, the tenant, or a third party (such as an industry governing body or a standards body). Further, depending on the implementation and needs of a workload, the membership policy 325 may be static or may be dynamic, wherein a dynamic policy may evolve over time to, for example, accommodate TCB (Trusted Computing Base) recovery of certain devices. For dynamic membership policies, depending on the embodiment, either the tenant, the CSP, or pre-agreed upon third party must approve the policy update. In an example, the CSP orchestrator may control requesting the addition of devices/accelerators, however the security manager ensures only requests meeting the policy are implemented.

The membership policy 325 may not itself have confidentiality requirements, although the membership policy may be kept confidential by a CSP environment to provide additional security. However, in some embodiments the security manager 330 is required to protect the membership policy during use and during storage, wherein the protection may typically include application of at least integrity and replay protection to maintain the contents of the membership policy.

In some embodiments, the security manager 330 may then utilize the membership policy 325 to admit an initial set of compute nodes 355 to support the workload of the tenant 305, the set of compute nodes (XPUs) 355 to form a compute fabric 350. The membership policy 325 provides a set of requirements that all admitted devices must adhere to. The requirements may be any set of requirements that are appropriate for the workload, and may be described in any computer language (C, Java, Python, etc.) that allows for meaningful representation of the membership policy.

In some embodiments, the security manager is to ensure that all XPUs 355 of the compute fabric 350 meet the requirements of the membership policy. The compute fabric 350 includes a set of homogenous or heterogenous compute nodes 355 (such as the illustrated set of hardware accelerators) that are assigned to the tenant 305 for running the workload of the tenant, wherein each compute node is to adhere to the established membership policy 325. The compute nodes are connected to each other in some fashion (such as PCIe, ethernet, or other type of connection.)

In some embodiments, the security manager is to present a security manager attestation 340 and the membership policy 345 that was associated with attestation of the compute fabric 350 to the tenant 305 to allow the tenant to verify the membership policy 345 against the membership policy 325 selected for the workload of the tenant 305 (wherein membership policy 345 should match membership policy 325).

In some embodiments, upon receiving and verifying the security manager attestation 340 and the membership policy 345, the tenant may then provide the secure workload 315 to the CSP 300 for processing.

Figure 4:
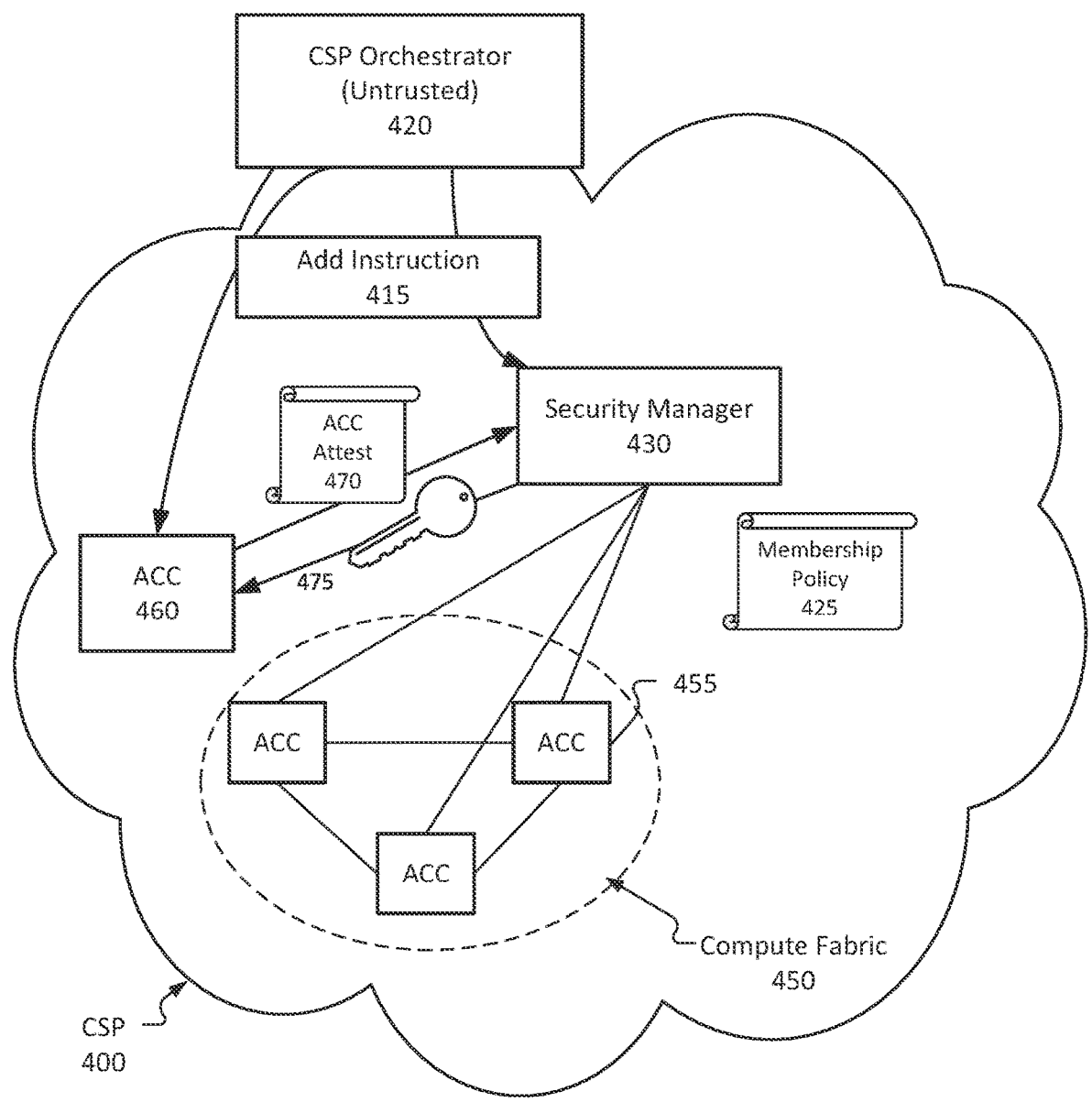
FIG. 4 is an illustration of an operation to add additional compute nodes in dynamic attestation of a compute fabric, according to some embodiments.

FIG. 4 is an illustration of an operation to add additional compute nodes in dynamic attestation of a compute fabric, according to some embodiments. In some embodiments, during the processing of a secure workload by a compute fabric in a cloud service provider environment, the processing needs of the workload may change, and in particular the needs may change such that one or more additional processing devices should be added to the compute fabric. In some embodiments, an apparatus, system, or process provides a flexible operation in which the additional processing devices may attested and added, or devices may be removed, without requiring additional tenant interactions between the CSP and the tenant to add or remove the devices.

In an example as illustrated in FIG. 4, compute fabric 450 may include a certain set of compute nodes, such as the illustrated set of hardware accelerators 455. The compute fabric may have been established as illustrated in FIG. 3. At some point in time during the lifespan of the workload the processing requirements of the workload may change, and in particular may require at least one additional hardware accelerator. In some embodiments, a CSP orchestrator 420 may, upon there being a determination that an additional device is needed, identify the device, such as hardware accelerator (ACC) 460, for addition to the compute fabric 450. In some embodiments, the orchestrator 420 may generate an instruction 415 regarding the additional device, wherein the instruction 415 may be an instruction to a security manager 430 instructing the security manager to add the device, or an instruction to the device 460 to contact the security manager.

In some embodiments, the security manager 430 is responsible for attesting to a pool of elastic device resources using a membership policy to describe the group of devices, rather than individual attestations. In this manner, the security manager may attest and add additional devices without requiring a new attestation to the tenant. In some embodiments, security manager 430 is to receive a device attestation from the device to be added, such as Accelerator Attestation (ACC Attest) 470 from ACC 460, and utilize the device attestation and the membership policy 425 to determine whether the device meets the requirements of the membership policy. Upon determining that the accelerator device 460 meets such requirements, the security manager 430 may provide the secure key 475 required for operation in the compute fabric.

In some embodiments, the CSP 400 may then proceed with processing of the workload for the tenant without requiring a new attestation to the tenant.

Figure 5:
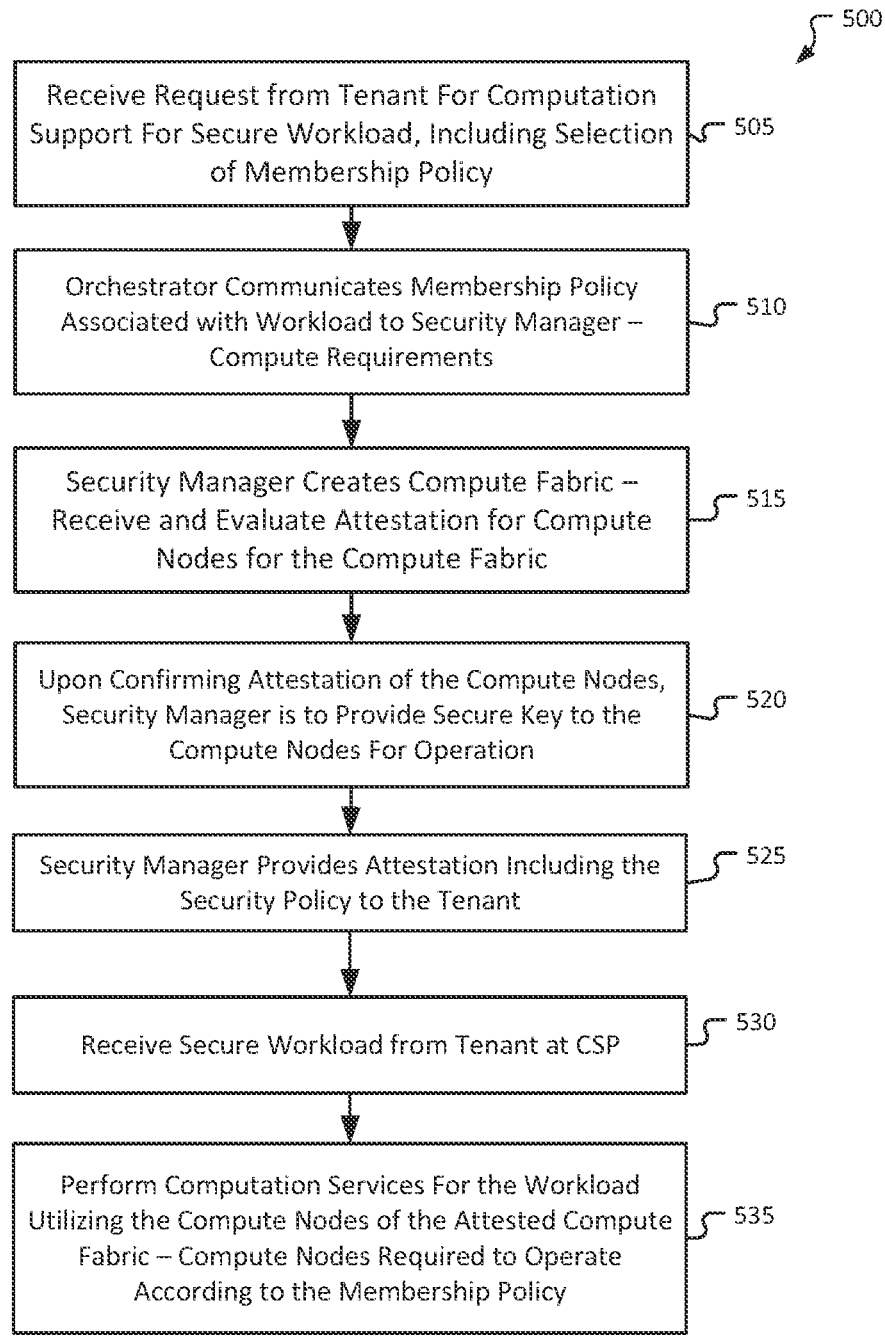
FIG. 5 is a flowchart to illustrate a process for attestation support for an elastic cloud computing environment, according to some embodiments.

FIG. 5 is a flowchart to illustrate a process for attestation support for an elastic cloud computing environment, according to some embodiments. In some embodiments, a process 500 includes receiving a request from a tenant for support by a third party (such as a cloud service provider) for computation of a workload, the request including selection of a membership policy 505. In some embodiments, the tenant may select the membership policy based upon requirements for the workload. Depending on the embodiment, the membership policy may be crafted by the tenant (and thus may be part of the request or otherwise transferred from the tenant to the third party), may be selected from a pre-established set of options from the third party or from another source, or may be obtained in another manner. In some embodiments, the request may be received by an entity, such as the orchestrator. In this manner, the tenant is initiating a request to the orchestrator for a group or network of compute nodes, which may include computing devices, hardware accelerators, or both (i.e., a compute fabric of XPUs) adhering to membership policy.

In some embodiments, the orchestrator is to communicate the membership policy associated with the workload to a security manager to request creation of the compute fabric 510 wherein the security manager is a trusted element that is capable of attesting for compute nodes. The security manager may be one of multiple security managers of the third party, depending on the particular implementation. In some embodiments, the orchestrator may further communicate compute requirements associated with the workload of the tenant for use in creating the compute fabric. Some embodiments include the orchestrator to instruct the security manager to add specific computing devices or hardware accelerators to the group of compute nodes, while in other embodiments, the orchestrator may contact certain computing devices or hardware accelerators and instruct these nodes to join the group managed by the security manager.

In some embodiments, the security manager is to create the compute fabric 515, wherein the creation of the compute fabric is based at least in part on the membership policy and the compute requirements associated with the workload of the tenant. In such process the security manager is to collect the pool of resources and indicate to the tenant when these are ready for the workload. In some embodiments, the creation of the compute pool includes requiring attestation of each of the compute nodes. In some embodiments, upon successfully receiving the attestation of each of the compute nodes for the compute fabric, the security manager is to provide a secure key to each of the compute nodes for use in secure operations in computation of the workload of the tenant 520.

In some embodiments, the security manager is to provide an attestation including the security policy to the tenant 525, wherein the attestation is to attest the selected compute nodes of the compute fabric to the tenant. In some embodiments, the attestation may further attest the security manager itself and the membership policy to be enforced by the security manager. The tenant may then check the attestation, and may check that the membership policy being enforced by the security manager matches the tenant's expectations. This check may be performed by the tenant, or by a third party service, according to the particular implementation.

In some embodiments, the third party providing support for the workload is receive the secure workload data from the tenant 530. In some embodiments, the secure workload data may be received at the security manager, with the security manage then to direct the data to the selected compute nodes of the attested compute fabric, or, in other embodiments, the tenant may communicate the secure workload data directly to the selected compute nodes of the compute fabric.

In some embodiments, computation services for the workload are performed utilizing the compute nodes of the attested compute fabric 535, wherein the compute nodes are required by the security manager to operate according to the membership policy associated with the workload.

Figure 6:
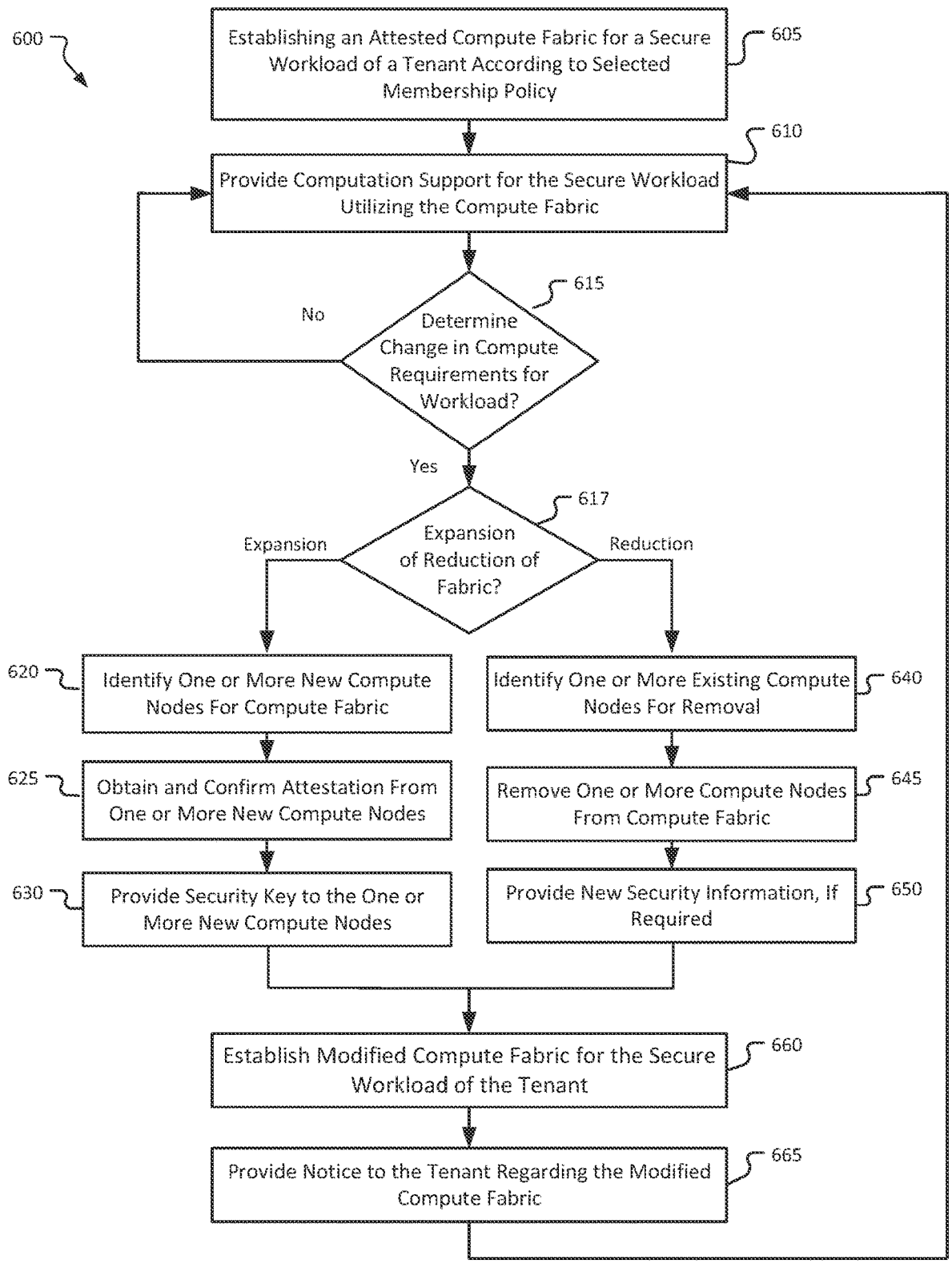
FIG. 6 is a flowchart to illustrate a process for dynamic modification of an attested compute fabric in an elastic cloud computing environment, according to some embodiments.

In some embodiments, the compute fabric may be dynamically modified and attested as computation requirements change for the workload over the lifespan of the workload, as the process is more specifically illustrated in FIG. 6.

FIG. 6 is a flowchart to illustrate a process for dynamic modification of an attested compute fabric in an elastic cloud computing environment, according to some embodiments. In some embodiments, a process 600 includes establishing an attested compute fabric for a secure workload of a tenant according to requirements of a selected membership policy 605, such a compute fabric established utilizing the process illustrated in FIG. 5, and providing computation support for the secure workload utilizing the compute fabric 610. In some embodiments, the compute fabric includes a certain set of compute nodes, including processing devices, hardware accelerators, or both, that are managed by a security manager according to the membership policy.

During the lifespan of the secure workload, the computation needs may increase or decrease. In some embodiments, the process 600 provides for dynamic attestation to allow modification of the set of compute nodes to add or remove members as appropriate. Upon determining that there is a sufficient change in compute requirements for the workload 615, operations are provided to dynamically modify the attested compute fabric without requiring interaction or evaluation by the tenant.

In some embodiments, if there is an expansion of the compute requirements 617, then one or more new compute nodes may be identified for the compute fabric 620, wherein the selection of the additional one or more compute nodes is made according to the membership policy. In some embodiments, the security manager is to obtain and confirm attestation from each of the additional compute nodes 625. Upon successfully attesting to one or more additional compute nodes, the security manager is to provide the required security key to such compute nodes 630.

In some embodiments, if there is a reduction in the compute requirements 617, then one or more existing compute nodes in the compute fabric may be selected for removal 640, wherein the selection of the one or more compute nodes is made according to the membership policy (e.g., any minimum support required for the workload according to the membership policy is maintained). Such selected compute nodes may then be removed from the compute fabric 645. In some embodiments, any new security that is required is then provided 650, such as, for example, a change in secure keys if this is required.

In some embodiments, the process provides for establishing the modified compute fabric for the secure workload of the tenant 660, and, if required, providing notice to the tenant regarding the modified compute fabric 665. For example, the notice may provide an identification of the current set of compute nodes in circumstances in which the tenant is to provide workload data directly to the compute nodes. The process then may continue with providing computation support for the secure workload utilizing the compute fabric 610.

FIG. 7 illustrates an embodiment of an exemplary computing architecture for implementing dynamic attestation support in a cloud environment, according to some embodiments. In various embodiments as described above, a computing architecture 700 may comprise or be implemented as part of an electronic device. In some embodiments, the computing architecture 700 may be representative, for example, of a computer system that implements one or more components of the operating environments described above. The computing architecture 700 may be utilized to provide attestation support in a cloud environment, such as described in FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

Figure 8A:
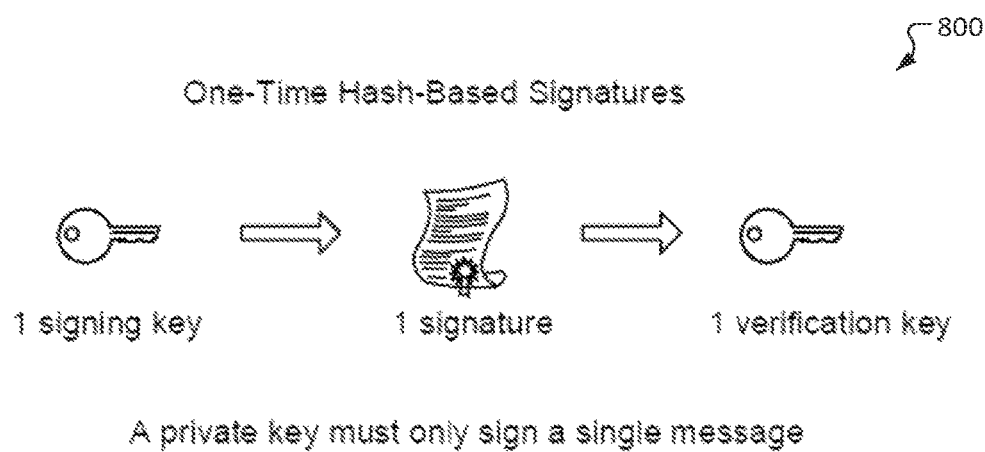
FIGS. 8A and 8B illustrate a one-time hash-based signatures scheme and a multi-time hash-based signatures scheme, respectively.
Figure 8B:
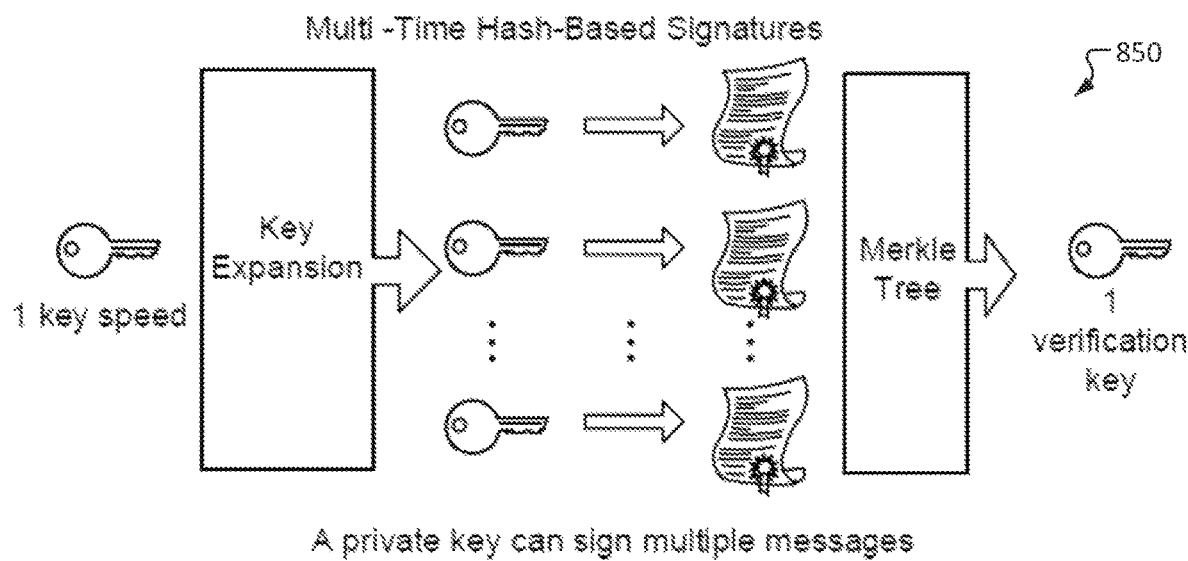

FIGS. 8A and 8B illustrate a one-time hash-based signatures scheme and a multi-time hash-based signatures scheme, respectively. The operations illustrated in FIGS. 8A and 8B may be utilized as required in providing security in support of workload computation with attested compute nodes. Hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform securedboot, which is regarded as the most resistant to quantum attacks.

For example, as illustrated with respect to FIG. 8A, a scheme of HBS is shown that uses Merkle trees along with one-time signature (OTS) scheme 800, such as using a private key to sign a message and a corresponding public key to verify the OTS message, where a private key only signs a single message.

Similarly, as illustrated with respect to FIG. 8B, another HBS scheme is shown, where this one relates to multi-time signatures (MTS) scheme 850, where a private key can sign multiple messages.

Figure 9A:
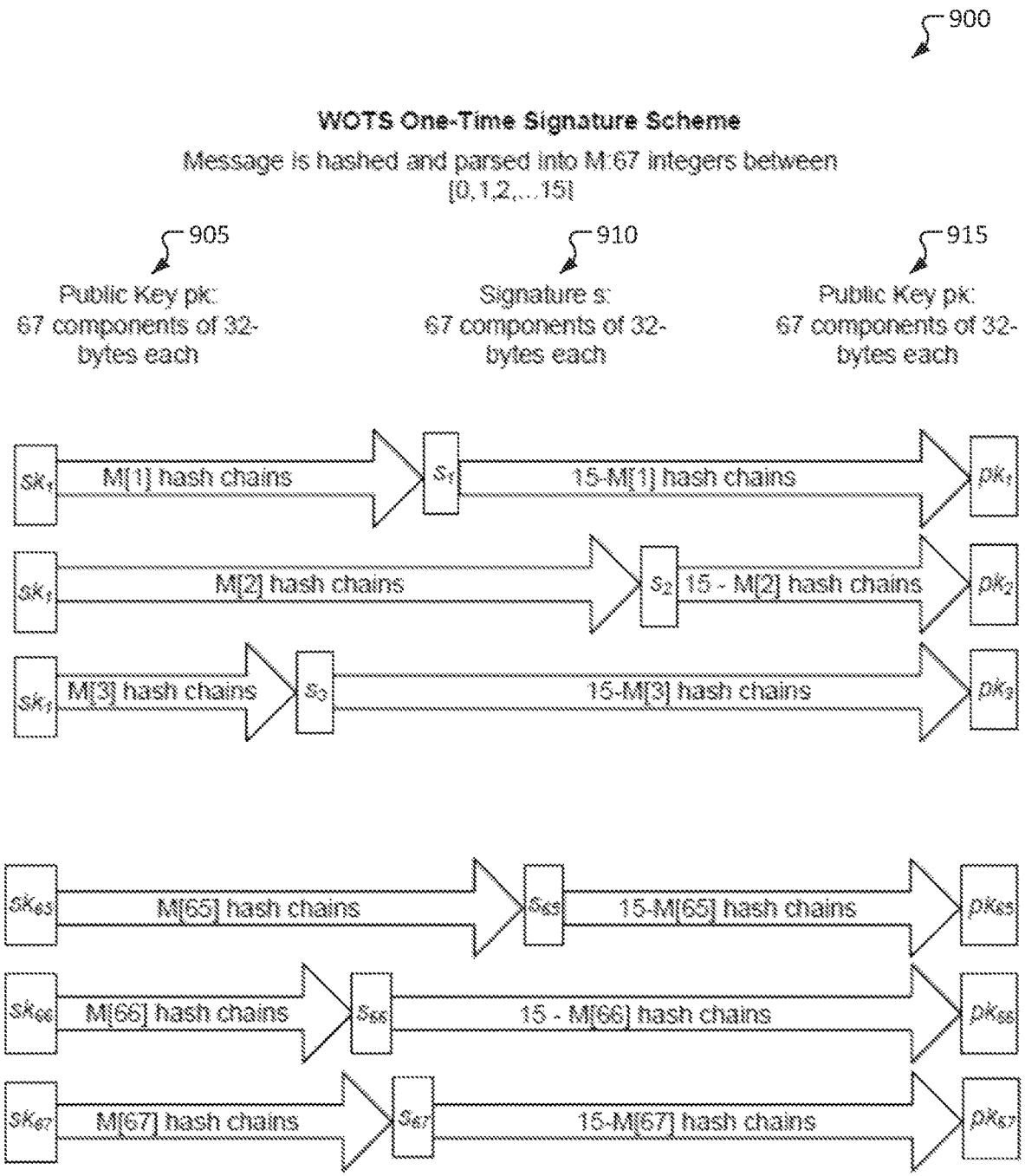
FIGS. 9A and 9B illustrate a one-time signature scheme and a multi-time signature scheme, respectively.
Figure 9B:
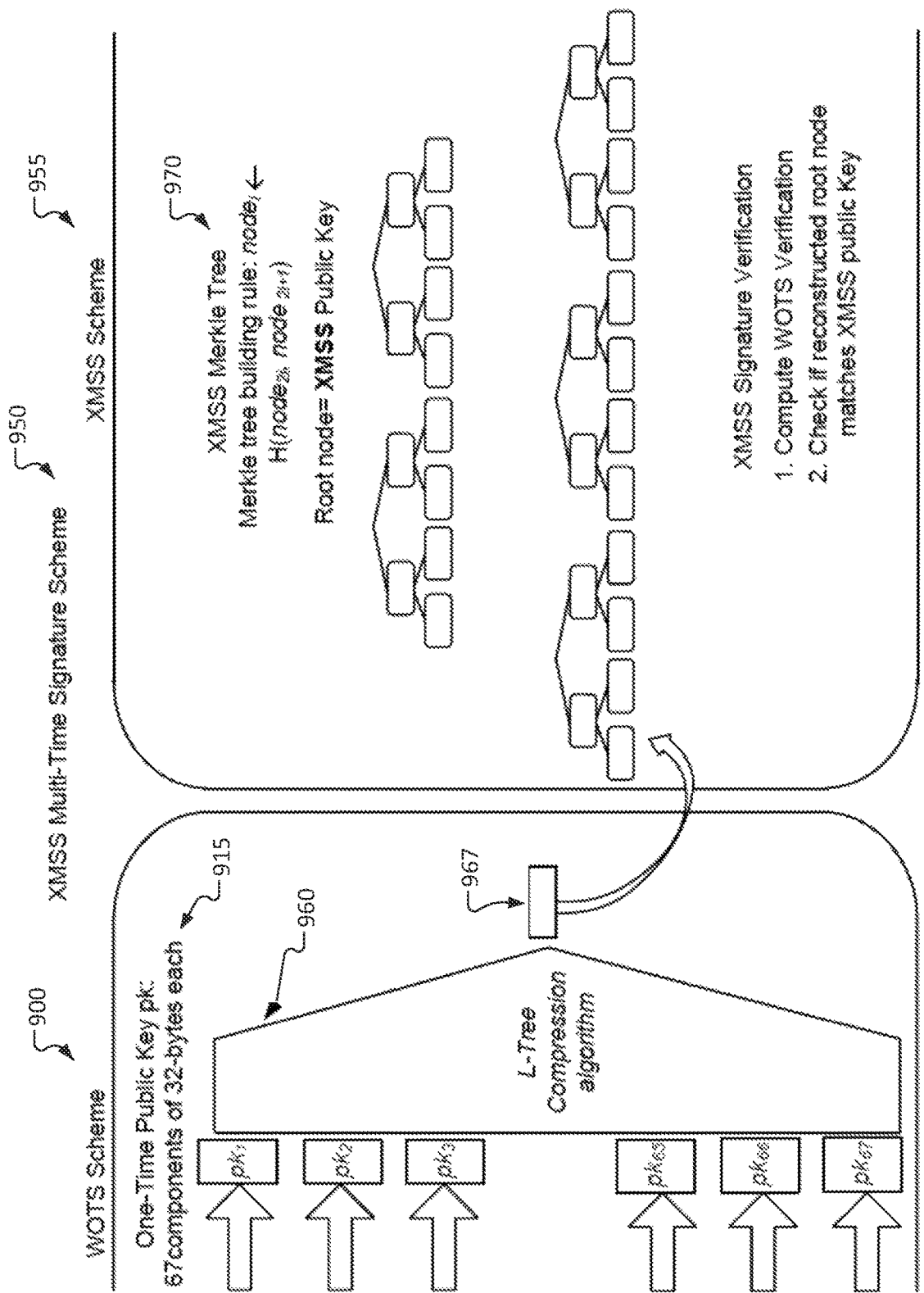

FIGS. 9A and 9B illustrate a one-time signature scheme and a multi-time signature scheme, respectively. Continuing with HBS-based OTS scheme 800 of FIG. 8A and MTS scheme 850 of FIG. 8B, FIG. 9A illustrates Winternitz OTS (WOTS) scheme 900, which was offered by Robert Winternitz of Stanford Mathematics Department, while FIG. 9B illustrates XMSS MTS scheme 950, respectively.

For example, WOTS scheme 900 of FIG. 9A provides for hashing and parsing of messages into M, with 67 integers between [0, 1, 2, . . . , 15], such as private key, sk, 905, signature, s, 910, and public key, pk, 915, with each having 67 components of 32 bytes each.

Now, for example, FIG. 9B illustrates XMSS MTS scheme 950 that allows for a combination of WOTS scheme 900 of FIG. 9A and XMSS scheme 955 having XMSS Merkle tree 970. As discussed previously with respect to FIG. 9A, WOTS scheme 900 is based on a one-time public key, pk, 915, having 67 components of 32 bytes each, that is then put through L-Tree compression algorithm 960 to offer WOTS compressed pk 967 to take a place in the XMSS Merkle tree 970 of XMSS scheme 955. It is contemplated that XMSS signature verification may include computing WOTS verification and checking to determine whether a reconstructed root node matches the XMSS public key, such as root node=XMSS public key.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9A and 9B and other figures may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following Examples pertain to further embodiments.

In Example 1, an apparatus one or more processors to process data; an orchestration element to receive a request for support of a workload of a tenant according to a selected membership policy, the orchestration element to select one or more compute nodes to provide computation for the workload; and a security manager to receive the membership policy and to receive attestations from the one or more selected compute nodes and, upon determining that the attestations meet the requirements of the membership policy, to add the one or more compute nodes to a group of compute nodes to provide computation for the workload.

In Example 2, the security manager is further to provide the membership policy and an attestation for the security manager to the tenant for verification of the group of compute nodes.

In Example 3, the orchestration element and the security manager are both parts of a same entity.

In Example 4, the group of compute nodes includes one or more processing units, one or more hardware accelerators, or both.

In Example 5, the orchestration element is to provide an instruction to the security manager regarding the one or more selected compute nodes, or the orchestration element is to provide an instruction to each of the one or more selected compute nodes to contact the security manager.

In Example 6, upon additional computation support being needed for the workload, the orchestration element is to select one or more additional compute nodes for the group of compute nodes.

In Example 7, the security manager to obtain attestations for the one or more additional compute nodes, and, upon determining that the attestations meet the requirements of the membership policy, to add the one or more additional compute nodes to the group of compute nodes.

In Example 8, the security manager is to add the one or more additional compute nodes to the group of compute nodes without requiring interaction or evaluation by the tenant.

In Example 9, the security manager is one of a plurality of security managers.

In Example 10, one or more non-transitory computer-readable storage mediums having stored thereon instructions that, when executed by one or more processors, cause the one or more processors to perform operations comprising receiving a request for computation of a workload of a tenant; selecting a set of one or more compute nodes to provide computation for the workload; providing a membership policy to a security manager, the membership policy including requirements for the one or more compute nodes; determining by the security manager wherein the one or more compute nodes meet the requirements of the membership policy and, upon determining that the one or more compute nodes meet the requirements of the membership policy, adding the one or more compute nodes to a group of compute nodes to provide computation for the workload; and providing the membership policy and an attestation for the security manager to the tenant for verification of the group of compute nodes.

In Example 11, the group of compute nodes includes one or more processing units, one or more hardware accelerators, or both.

In Example 12, the instructions further include instructions for providing an instruction to the security manager regarding the one or more selected compute nodes; or providing an instruction to each of the one or more selected compute nodes to contact the security manager.

In Example 13, the instructions further include instructions for determining that additional support is needed for computation of the workload; and selecting one or more additional compute nodes for the group of compute nodes.

In Example 14, the instructions further include instructions for obtaining attestations for the one or more additional compute nodes; and, upon determining that the attestations meet the requirements of the membership policy, adding the one or more additional compute nodes to the group of compute nodes.

In Example 15, the instructions further include instructions for providing a security key to the one or more additional compute nodes.

In Example 16, a system includes one or more processors including one or more processing cores to process data; a memory for storage of data, including data for one or more secure operations; a plurality of compute nodes to provide computation; an orchestrator to receive a request for support of a workload of a tenant according to a selected membership policy, the orchestrator to select a set of one or more compute nodes to provide computation for the workload; and a security manager to receive the membership policy and to receive attestations from the one or more selected compute nodes and, upon determining that the attestations meet the requirements of the membership policy, to add the one or more compute nodes to a group of compute nodes to provide computation for the workload, wherein the security manager is to provide the membership policy and an attestation for the security manager to the tenant for verification of the group of compute nodes.

In Example 17, the group of compute nodes includes one or more processing units, one or more hardware accelerators, or both.

In Example 18, the orchestrator is to provide an instruction to the security manager regarding the one or more selected compute nodes, or is to provide an instruction to each of the one or more selected compute nodes to contact the security manager.

In Example 19, upon additional computation support being needed for the workload, the orchestrator is to select one or more additional compute nodes for the group of compute nodes.

In Example 20, the security manager to obtain attestations for the one or more additional compute nodes, and, upon determining that the attestations meet the requirements of the membership policy, to add the one or more additional compute nodes to the group of compute nodes.

In Example 21, an apparatus includes means for receiving a request for computation of a workload of a tenant; means for selecting a set of one or more compute nodes to provide computation for the workload; means for providing a membership policy to a security manager, the membership policy including requirements for the one or more compute nodes; means for determining by the security manager wherein the one or more compute nodes meet the requirements of the membership policy and, upon determining that the one or more compute nodes meet the requirements of the membership policy, adding the one or more compute nodes to the a group of compute nodes to provide computation for the workload; and means for providing the membership policy and an attestation for the security manager to the tenant for verification of the group of compute nodes.

In Example 22, the group of compute nodes includes one or more processing units, one or more hardware accelerators, or both.

In Example 23, the apparatus further includes means for providing an instruction to the security manager regarding the one or more selected compute nodes; or providing an instruction to each of the one or more selected compute nodes to contact the security manager.

In Example 24, the apparatus further includes means for determining that additional support is needed for computation of the workload; and means for selecting one or more additional compute nodes for the group of compute nodes.

In Example 25, the apparatus further includes means for obtaining attestations for the one or more additional compute nodes; and means for adding the one or more additional compute nodes to the group of compute nodes upon determining that the attestations meet the requirements of the membership policy.

In Example 26, the apparatus further includes means for providing a security key to the one or more additional compute nodes.

Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
   one or more processors to process data;
   an orchestration element to receive a membership policy and a request for support of a workload of a tenant according to the received membership policy, the membership policy providing a set of requirements that that are mandated for compute nodes supporting the workload of the tenant, the orchestration element to select one or more compute nodes to provide computation for the workload; and
   a security manager to:
      receive the membership policy and receive attestations from the one or more selected compute nodes,
      evaluate the attestations for the one or more selected compute nodes against the membership policy,
      upon determining that the attestations for the one or more compute nodes meet the requirements of the membership policy, add the one or more compute nodes to a group of compute nodes to provide computation for the workload, and
      provide the membership policy and an attestation for the security manager to the tenant, wherein the attestation is to attest the selected one or more compute nodes to the tenant.

2. The apparatus of claim 1, wherein the orchestration element and the security manager are both parts of a same entity.

3. The apparatus of claim 1, wherein the group of compute nodes includes one or more processing units, one or more hardware accelerators, or both.

4. The apparatus of claim 1, wherein the orchestration element is to provide an instruction to the security manager regarding the one or more selected compute nodes, or the orchestration element is to provide an instruction to each of the one or more selected compute nodes to contact the security manager.

5. The apparatus of claim 1, wherein, upon additional computation support being needed for the workload, the orchestration element is to select one or more additional compute nodes for the group of compute nodes.

6. The apparatus of claim 5, wherein the security manager to obtain attestations for the one or more additional compute nodes, evaluate the attestations for the one or more additional compute nodes against the membership policy, and, upon determining that the attestations meet the requirements of the membership policy, to add the one or more additional compute nodes to the group of compute nodes.

7. The apparatus of claim 6, wherein the security manager is to add the one or more additional compute nodes to the group of compute nodes based at least in part on the membership policy without requiring interaction or evaluation by the tenant.

8. The apparatus of claim 1, wherein the security manager is one of a plurality of security managers.

9. The apparatus of claim 1, wherein the attestation for the security manager further attests the security manager and attests the membership policy enforced by the security manager.

10. One or more non-transitory computer-readable storage mediums having stored thereon executable computer program instructions that, when executed by one or more processors, cause the one or more processors to perform operations comprising:
    receiving at an orchestrator a membership policy and a request for computation of a workload of a tenant according to the received membership policy, the membership policy providing a set of requirements that that are mandated for compute nodes supporting the workload of the tenant;
    selecting a set of one or more compute nodes to provide computation for the workload;
    providing the membership policy and attestations from the one or more selected compute nodes to a security manager;
    evaluating by the security manager the attestations for the one or more selected compute nodes against the membership policy, and, upon determining that the attestations for the one or more compute nodes meet the requirements of the membership policy, adding the one or more compute nodes to a group of compute nodes to provide computation for the workload; and
    providing the membership policy and an attestation for the security manager to the tenant for verification of the group of compute nodes.

11. The one or more storage mediums of claim 10, wherein the group of compute nodes includes one or more processing units, one or more hardware accelerators, or both.

12. The one or more storage mediums of claim 11, further comprising executable computer program instructions that, when executed by one or more processors, cause the one or more processors to perform operations comprising one of the following:
    providing an instruction to the security manager regarding the one or more selected compute nodes; or
    providing an instruction to each of the one or more selected compute nodes to contact the security manager.

13. The one or more storage mediums of claim 11, further comprising executable computer program instructions that, when executed by one or more processors, cause the one or more processors to perform operations comprising:

determining that additional support is needed for computation of the workload; and selecting, by the orchestrator, one or more additional compute nodes for the group of compute nodes.

14. The one or more storage mediums of claim 13, further comprising executable computer program instructions that, when executed by one or more processors, cause the one or more processors to perform operations comprising:

obtaining by the security manager attestations for the one or more additional compute nodes;

evaluate the attestations for the one or more additional compute nodes against the membership policy; and upon determining that the attestations meet the requirements of the membership policy, adding the one or more additional compute nodes to the group of compute nodes.

15. The one or more storage mediums of claim 14, further comprising executable computer program instructions that, when executed by one or more processors, cause the one or more processors to perform operations comprising:

providing a security key to the one or more additional compute nodes.

16. A system comprising:

one or more processors including one or more processing cores to process data;

a memory for storage of data, including data for one or more secure operations;

a plurality of compute nodes to provide computation;

an orchestrator to receive a membership policy and a request for support of a workload of a tenant according to the received membership policy, the membership policy providing a set of requirements that that are mandated for compute nodes supporting the workload of the tenant, the orchestrator to select a set of one or more compute nodes of the plurality of compute nodes to provide computation for the workload; and a security manager to:

receive the membership policy and receive attestations from the one or more selected compute nodes, evaluate the attestations for the one or more selected compute nodes against the membership policy, upon determining that the attestations for the one or more compute nodes meet the requirements of the membership policy, add the one or more compute nodes to a group of compute nodes to provide computation for the workload; and provide the membership policy and an attestation for the security manager to the tenant for verification of the group of compute nodes.

17. The system of claim 16, wherein the group of compute nodes includes one or more processing units, one or more hardware accelerators, or both.

18. The system of claim 16, wherein the orchestrator is to provide an instruction to the security manager regarding the one or more selected compute nodes, or is to provide an instruction to each of the one or more selected compute nodes to contact the security manager.

19. The system of claim 16, wherein, upon additional computation support being needed for the workload, the orchestrator is to select one or more additional compute nodes for the group of compute nodes.

20. The system of claim 19, wherein the security manager to obtain attestations for the one or more additional compute nodes, evaluate the attestations for the one or more additional compute nodes against the membership policy, and, upon determining that the attestations meet the requirements of the membership policy, to add the one or more additional compute nodes to the group of compute nodes.

* * * * *